United States Patent
Hallack et al.

(10) Patent No.: US 10,675,976 B2
(45) Date of Patent: Jun. 9, 2020

(54) DISPLAY ASSEMBLY FOR A VEHICLE DOORSILL

(71) Applicant: GENTEX CORPORATION, Zeeland, MI (US)

(72) Inventors: Jason D. Hallack, Allendale, MI (US); Eric S. Lundy, Grand Rapids, MI (US); Danny L. Minikey, Jr., Fenwick, MI (US); Neil J. Boehm, Allegan, MI (US); Sebastien C. Jaeger, Saugatuck, MI (US); David J. Cammenga, Zeeland, MI (US); Brian D. Jewell, Grand Rapids, MI (US); Blake R. Adams, Comstock Park, MI (US); Gregory M. Ejsmont, Grand Rapids, MI (US); William D. Short, II, Zeeland, MI (US); Karri M. Kluting, Ravenna, MI (US); William C. Schenk, Zeeland, MI (US); Mark R. Roth, Grand Rapids, MI (US); Andrew D. Weller, Holland, MI (US); Jonathan A. Morey, Ravenna, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/995,463

(22) Filed: Jun. 1, 2018

(65) Prior Publication Data
US 2018/0345791 A1 Dec. 6, 2018

Related U.S. Application Data

(60) Provisional application No. 62/514,432, filed on Jun. 2, 2017, provisional application No. 62/553,345, filed
(Continued)

(51) Int. Cl.
*B60K 35/00* (2006.01)
*B60R 13/04* (2006.01)
(Continued)

(52) U.S. Cl.
CPC .............. *B60K 35/00* (2013.01); *B60Q 1/323* (2013.01); *B60Q 3/217* (2017.02); *B60R 13/04* (2013.01);
(Continued)

(58) Field of Classification Search
CPC .... B60K 2370/77; B60K 35/00; B60Q 1/323; B60R 13/04
See application file for complete search history.

(56) References Cited

U.S. PATENT DOCUMENTS

2005/0280514 A1 12/2005 Doan
2009/0132130 A1* 5/2009 Kumon .................. B60K 35/00
701/49

(Continued)

FOREIGN PATENT DOCUMENTS

DE 102011114959 A1 4/2012
DE 102012019299 A1 8/2013
(Continued)

OTHER PUBLICATIONS

Mun et al., Korean Patent application KR 1020090048528, May 2009, machine translation (Year: 2009).*
(Continued)

*Primary Examiner* — Tracie Y Green
(74) *Attorney, Agent, or Firm* — Price Heneveld LLP; Bradley D. Johnson (57) ABSTRACT

A vehicle display assembly may comprise a transparent element defining a viewing surface, a display element disposed behind the transparent element, and a printed circuit board in electrical communication with the display element.
(Continued)

The display element is configured to generate an image visible through the transparent element. The vehicle display assembly may be in communication with at least one of a vehicle sensor and a vehicle computer. The images appearing in the display element may change orientation based on the presence or absence of a vehicle occupant.

12 Claims, 10 Drawing Sheets

Related U.S. Application Data on Sep. 1, 2017, provisional application No. 62/658,177, filed on Apr. 16, 2018.

(51) Int. Cl.
    *B60Q 1/32* (2006.01)
    *B60Q 3/217* (2017.01)
(52) U.S. Cl.
    CPC .. *B60K 2370/1523* (2019.05); *B60K 2370/77* (2019.05); *B60Q 2400/40* (2013.01)

(56) References Cited

U.S. PATENT DOCUMENTS

| | | | | |
|---|---|---|---|---|
| 2010/0085171 | A1* | 4/2010 | Do | G08B 21/06 340/426.1 |
| 2010/0124075 | A1* | 5/2010 | Ye | C08J 5/18 362/606 |
| 2015/0046027 | A1* | 2/2015 | Sura | B60K 35/00 701/36 |
| 2015/0185557 | A1 | 7/2015 | Sung | |
| 2015/0291032 | A1* | 10/2015 | Kim | B60K 37/06 701/36 |
| 2016/0349432 | A1* | 12/2016 | Huang | G02B 6/005 |
| 2017/0031194 | A1* | 2/2017 | Banin | G02F 1/133606 |
| 2019/0033651 | A1* | 1/2019 | Lee | G02F 1/133305 |

FOREIGN PATENT DOCUMENTS

| | | |
|---|---|---|
| DE | 102014016570 A1 | 5/2016 |
| EP | 1950725 A1 | 7/2008 |
| GB | 2526938 A | 12/2015 |
| JP | 2005238859 A | 9/2005 |
| JP | 2011093469 A | 5/2011 |
| JP | 2014004918 A | 1/2014 |
| KR | 20090048528 A | 5/2009 |

OTHER PUBLICATIONS

Sasada et al., japanes Patent application JP2005-238859, Aug. 2005, macine translation (Year: 2005).*

Hiroki et al., Japanese Patent application JP2014-004918, Jan. 2014, machine translation (Year: 2014).*

International Search Report dated Sep. 13, 2018, for corresponding PCT application No. PCT/US2018/035578, 8 pages.

International Preliminary Report on Patentability dated Dec. 3, 2019, for corresponding PCT application No. PCT/US2018/035578, 6 pages.

Extended European Search Report dated May 4, 2020 for corresponding EP Application No. 18808716.7, 8 pages.

* cited by examiner

DISPLAY ASSEMBLY FOR A VEHICLE DOORSILL

CROSS-REFERENCE TO RELATED APPLICATIONS

This application claims the benefit of and priority to U.S. Provisional Patent Application No. 62/514,432, filed on Jun. 2, 2017, entitled Video Door Sill; U.S. Provisional Patent Application No. 62/553,345, filed on Sep. 1, 2017, entitled Vehicle Door Sill Display Assembly; and U.S. Provisional Patent Application No. 62/658,177, filed on Apr. 16, 2018, entitled Vehicle Door Sill Display Assembly, the entire disclosures of which are hereby incorporated herein by reference.

FIELD OF THE DISCLOSURE

The present disclosure generally relates to a vehicle display assembly, and more particularly, to a vehicle display assembly benefitting from a low profile and easily accommodated in a vehicle door sill.

SUMMARY

In an aspect, a vehicle display assembly comprises a transparent element defining a viewing surface; a display disposed behind the transparent element; a film stack optically coupled to the display and configured to enhance the brightness of the display in one or more dimensions; a light-producing assembly positioned behind the brightness enhancing film stack and optically coupled thereto, the light-producing assembly having an optical element and a light source disposed proximate an edge of the optical element and configured to emit light therethrough; and a printed circuit board electrically coupled to the light source and the display; wherein the display is configured to generate an image visible through the transparent element.

In an aspect, a display assembly for a vehicle door comprises a display configured to provide image data to a vehicle occupant, the display comprising: a magnetic switch operable to activate the display when the vehicle door is opened, and an electrical connector configured to supply power and data to the display.

In an aspect, a display assembly for a vehicle door comprises a display configured to provide image data to a vehicle occupant, the display comprising: a magnetic switch configured to supply power to the display when the vehicle door is opened; and an electrical connector configured to supply power and data to the display; and a memory module configured to supply stored image data to the display.

A display assembly for a door, the display assembly comprises a display configured to provide image data to a vehicle occupant, the display comprising: a magnetic switch configured to provide power to the display based on an activation cue; and an electrical connector configured to supply power and data to the display.

In an aspect, a vehicle display assembly comprises a transparent element defining a viewing surface; a display disposed behind the transparent element; and a first printed circuit board in electrical communication with the display; wherein the display is configured to generate an image visible through the transparent element; and wherein the vehicle display assembly is associated with and in proximity to a door of a vehicle.

In an aspect, a vehicle display assembly comprises a transparent element defining a viewing surface; a display disposed behind the transparent element; a first printed circuit board disposed behind the display; and a housing at least partially enclosing the transparent element, the display, and the first printed circuit board; wherein the display is configured to generate an image visible through the transparent element.

BRIEF DESCRIPTION OF THE DRAWINGS

The present disclosure will become more fully understood from the detailed description and the accompanying drawings, wherein.

DETAILED DESCRIPTION OF THE EMBODIMENTS

Figure 1:
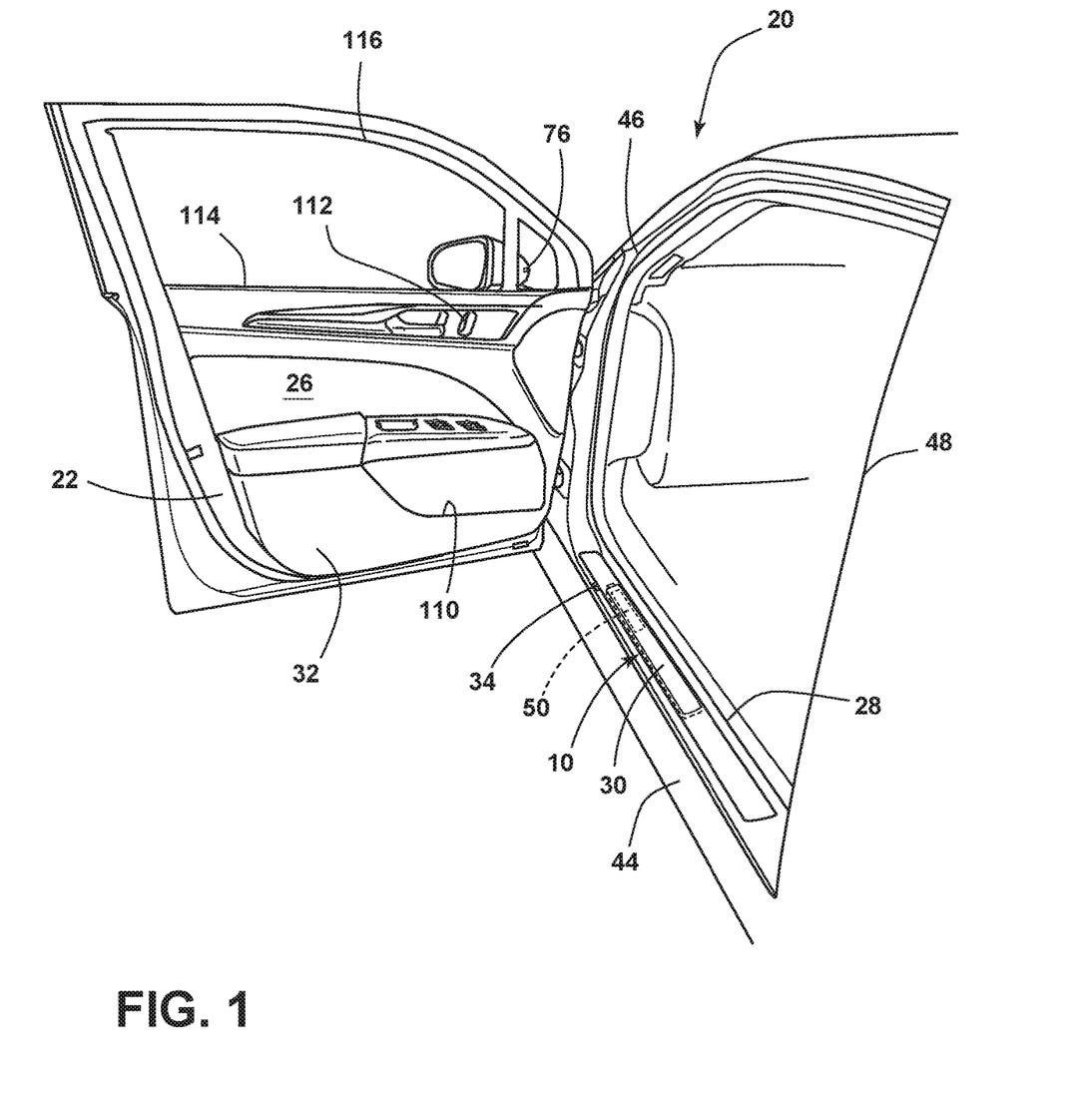
FIG. 1 is a front perspective view of an embodiment of the present disclosure showing a portion of a vehicle with a display assembly disposed on a bottom portion of the vehicle door frame.
Figure 2:
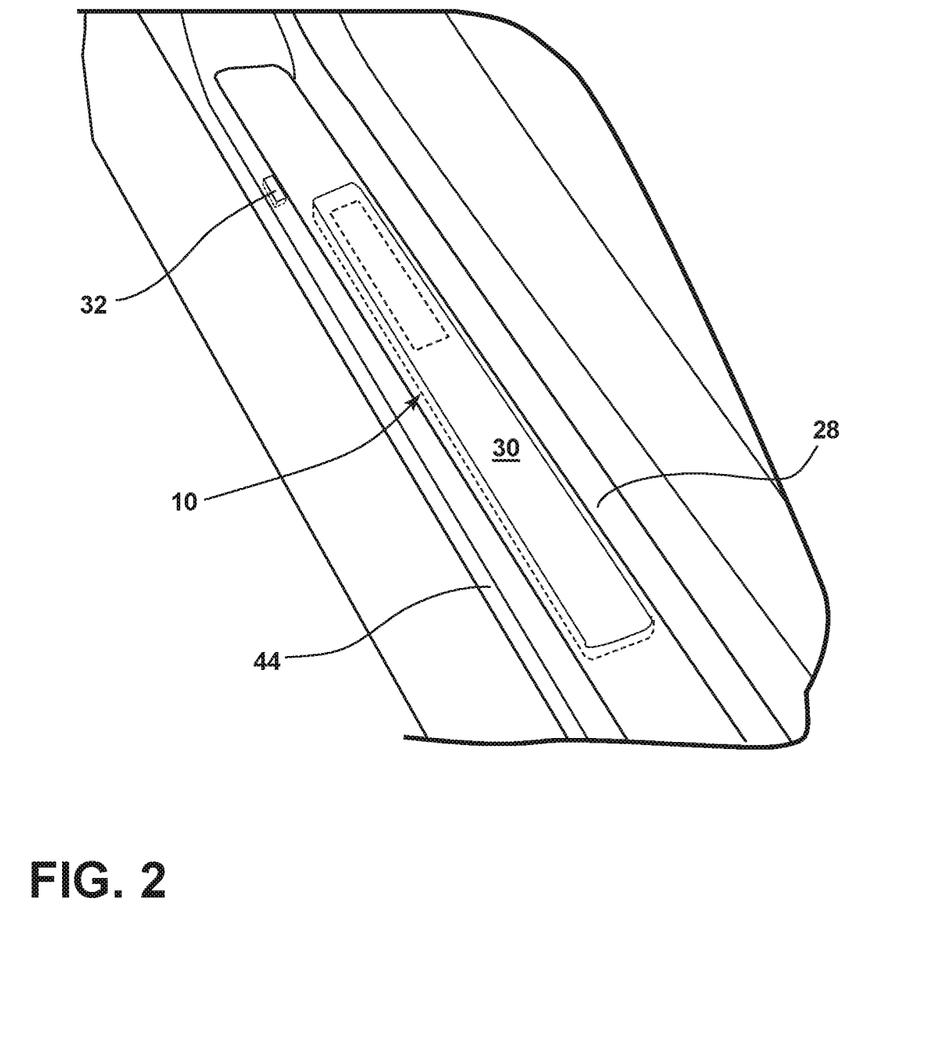
FIG. 2 is an enlarged front perspective view of the display assembly of FIG. 1.
Figure 3:
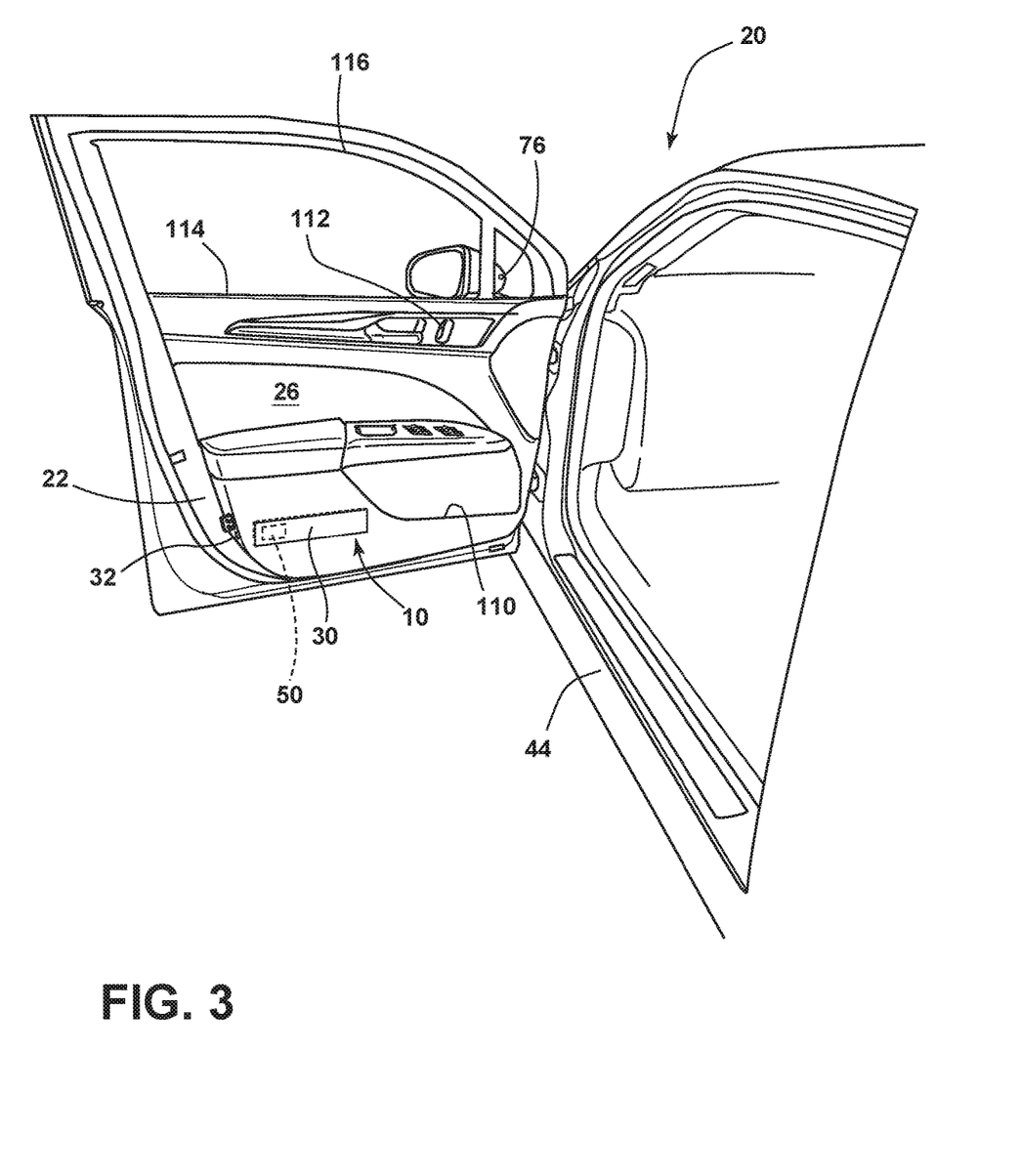
FIG. 3 is a front perspective view of an embodiment of the present disclosure showing a vehicle door with a display assembly disposed thereon.
Figure 4:
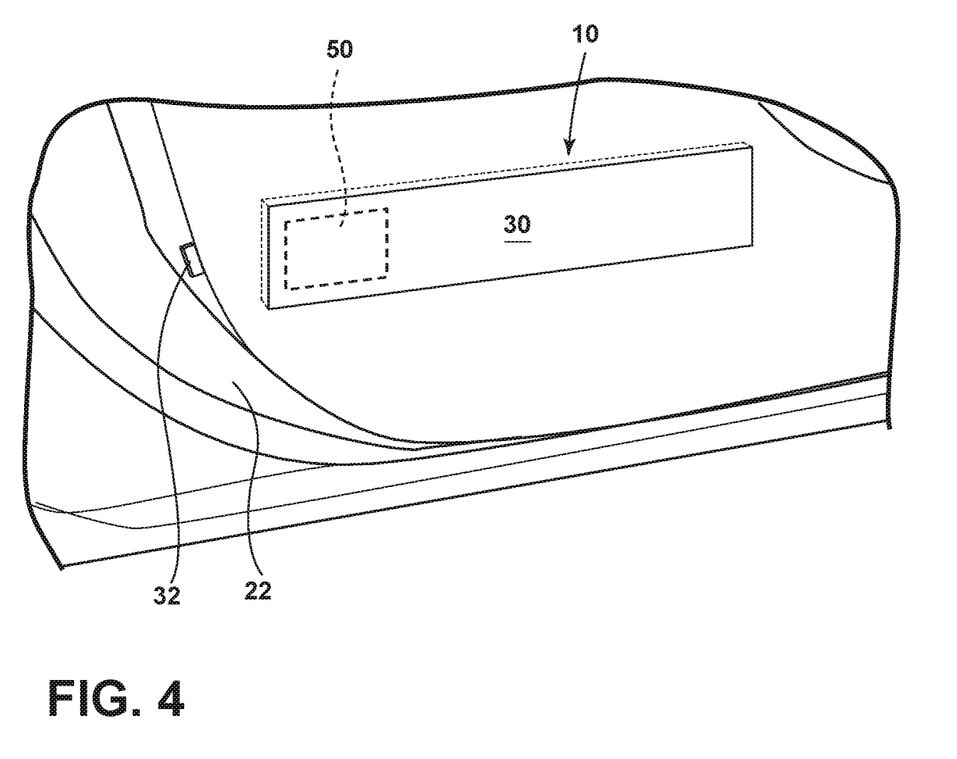
FIG. 4 is an enlarged front perspective view of the display assembly of FIG. 3.
Figure 5:
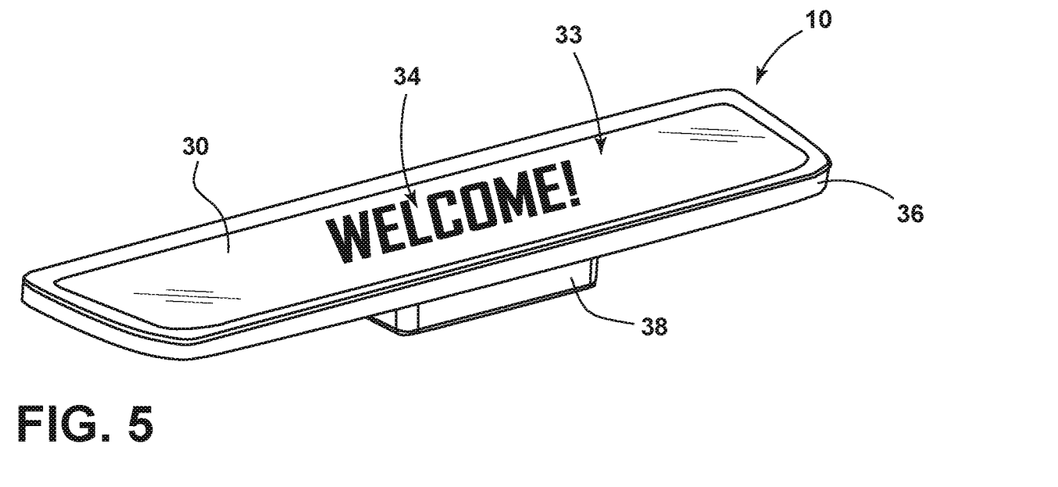
FIG. 5 is an isometric view of an embodiment of a vehicle display assembly in accordance with this disclosure.
Figure 6A:
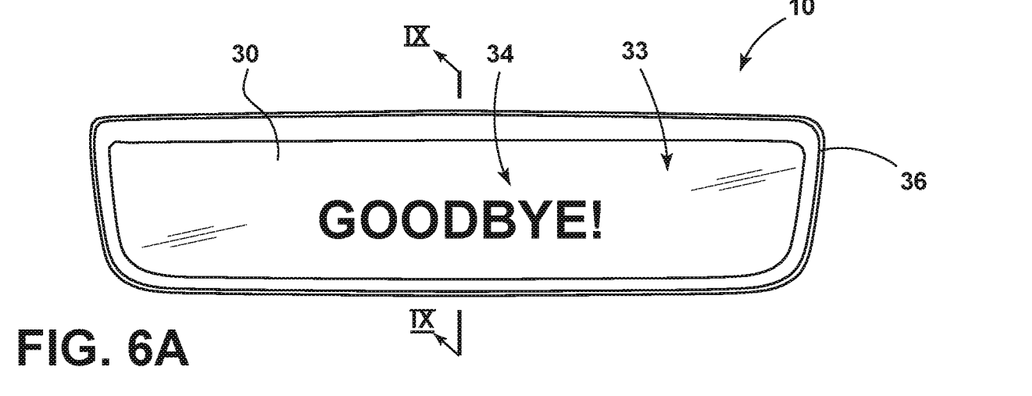
FIG. 6A is a top view of an embodiment of the vehicle display assembly of FIG. 5 with the image in a first orientation.
Figure 6B:
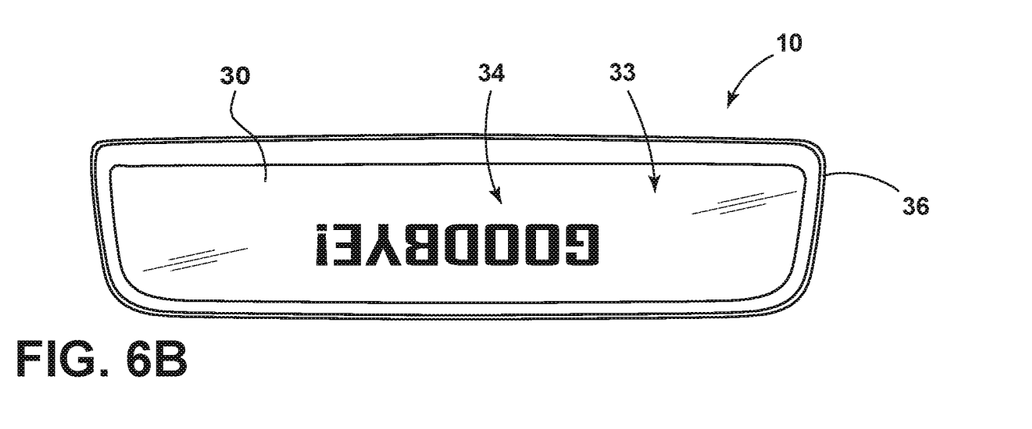
FIG. 6B is a top view of the vehicle display assembly of FIG. 5 with the image in a second orientation.
Figure 7:
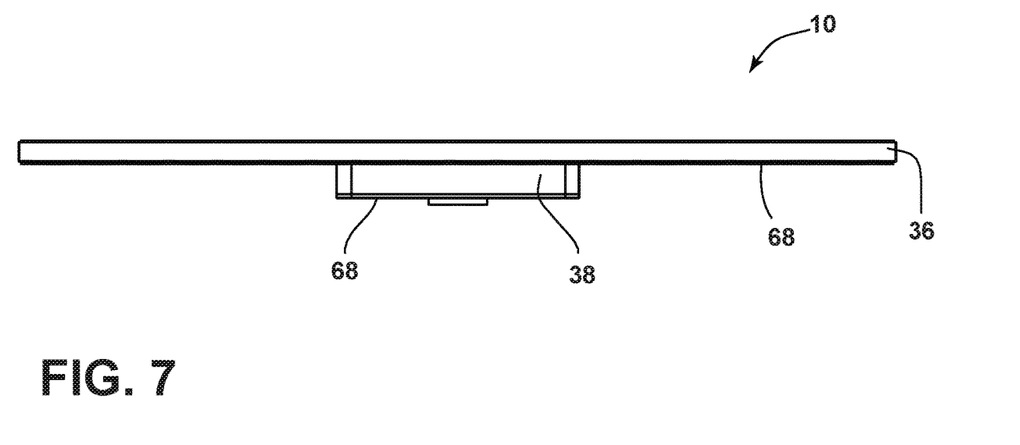
FIG. 7 is a side view of the vehicle display assembly of FIG. 5.
Figure 8:
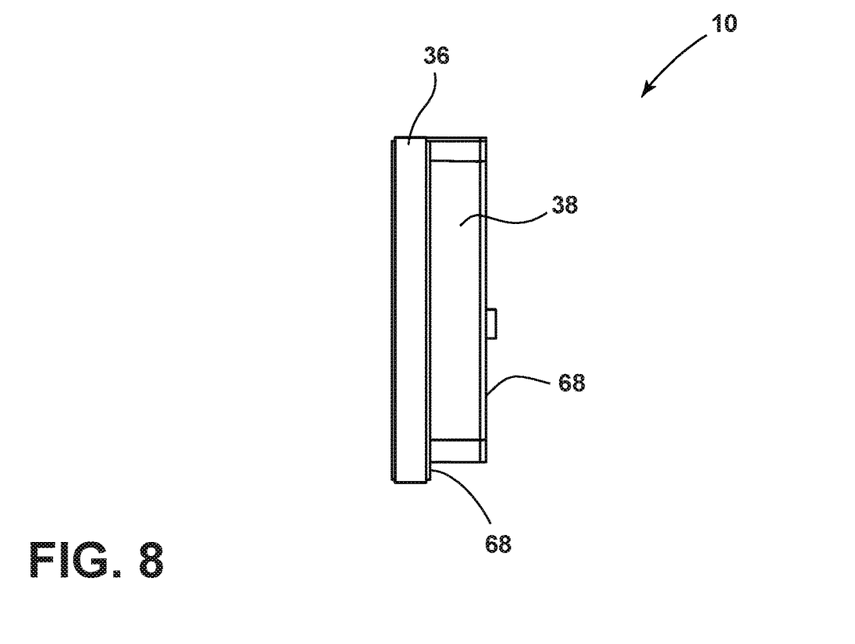
FIG. 8 is an end view of the vehicle display assembly of FIG. 5.
Figure 9:
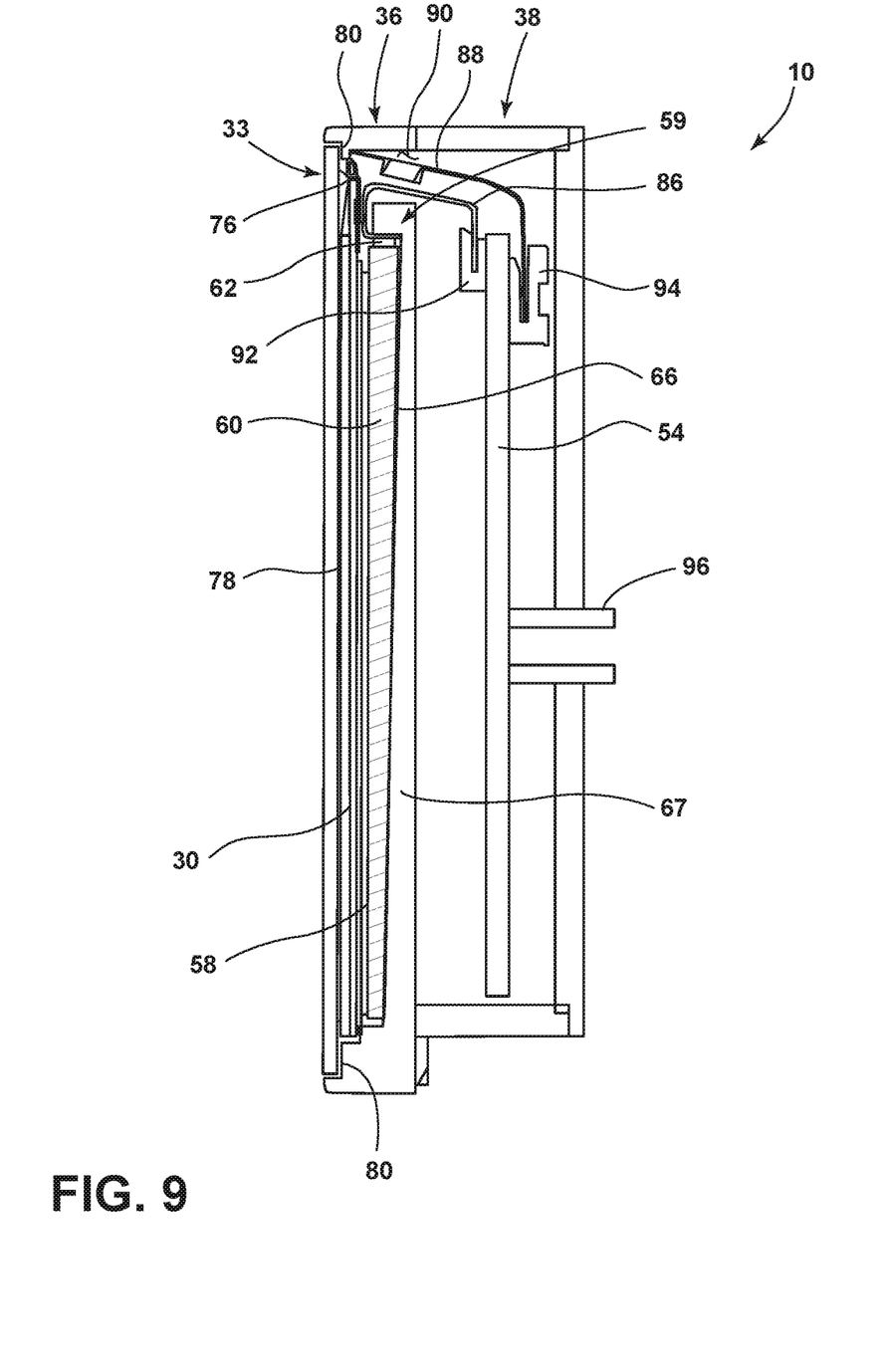
FIG. 9 is a cross-sectional view of the vehicle display assembly taken along line IX-IX of FIG. 6A.
Figure 10:
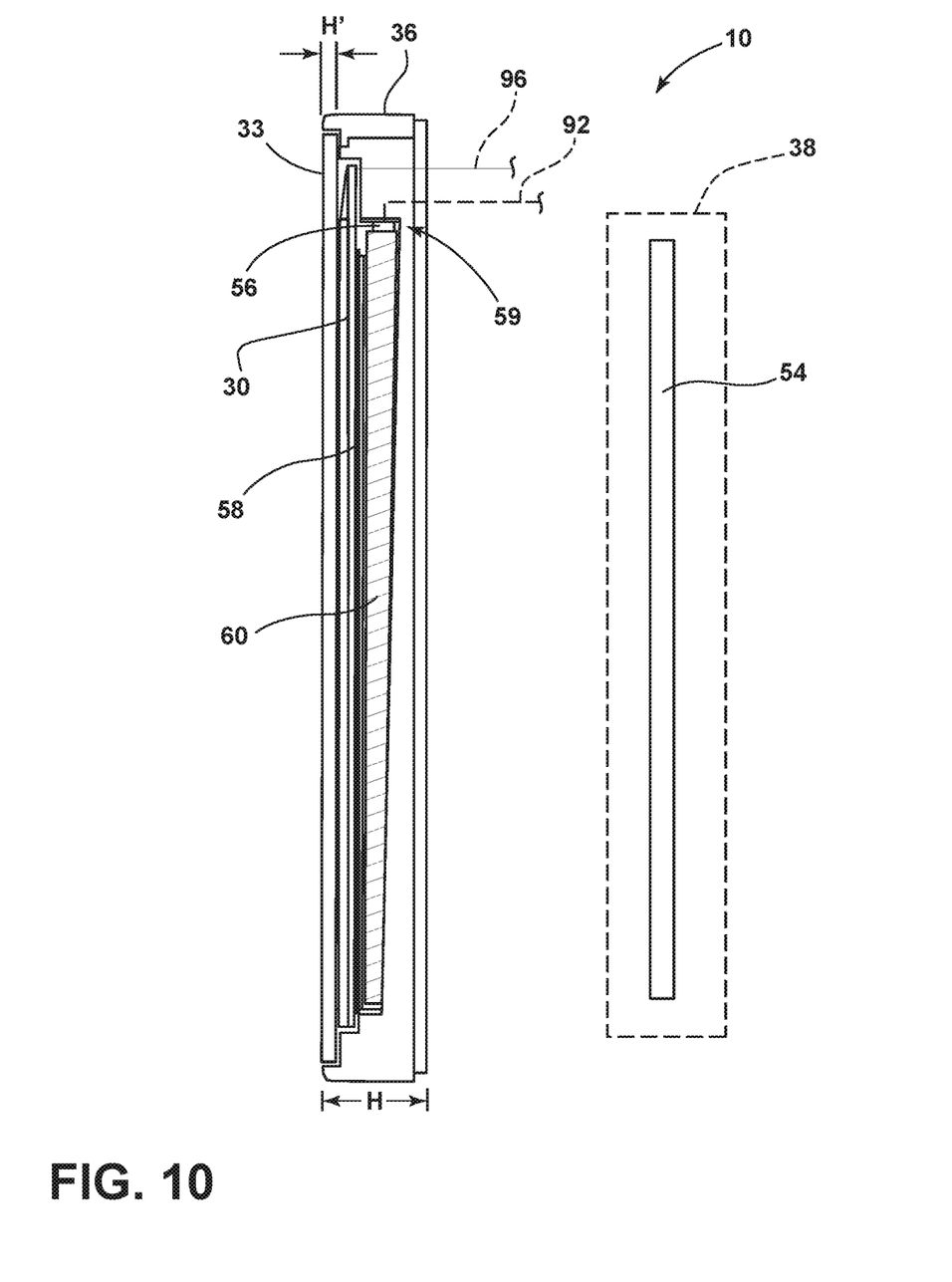
FIG. 10 is a side view of another embodiment of the vehicle display assembly.

FIGS. 1-4 show a display assembly 10 for a vehicle 20. In some embodiments, vehicle display assembly 10 may be disposed on a vehicle door sill 24, a vehicle door panel 26, or in various locations on a vehicle door frame 28. Vehicle display assembly 10 may include a display element 30 configured to provide image data 34 to a vehicle occupant. Referring to FIGS. 5-6B, in some embodiments, vehicle display assembly 10 may comprise at least a first housing 36, a generally transparent element 33 and display element 30. Transparent element 33 may define a viewing surface through which an image generated from image data 34 is displayed. Display element 30 may be configured to generate the image from image data 34. Display element 30 may correspond to a liquid crystal display (LCD), a light emitting diode (LED), an organic light emitting diode (OLED) display, a micro-LED display, or any other display known to a skilled artisan. Display element 30 may be selectively activated, and may be activated upon the opening of a vehicle door 22 associated with vehicle display assembly 10. In some embodiments, display element 30 may include a switch 32 operable to activate display element 30 when vehicle door 22 is opened and to deactivate display element 30 when vehicle door 22 is closed.

With reference again to FIGS. 1-4, display element 30 may be generally configured to provide image data 34 to a user at least when vehicle door 22 is opened or is in an open position. In some embodiments, image data 34 may be provided on display element 30 when vehicle door 22 is closed, or when vehicle 20 is traveling. Image data 34 shown by display element 30 may be preselected graphics, including logos, short videos, and the like.

Referring again to FIGS. 1-4, in some embodiments, vehicle display assembly 10 may be positioned on a door frame 28, and may be proximate a vehicle rocker panel 44. In some embodiments, vehicle display assembly 10 may be assembled to a vehicle door sill 24 and may take the place of a conventional door sill plate. In assembly, vehicle display assembly 10 may be generally flush with vehicle door sill 24, but may be raised or recessed in relation thereto if so desired. By providing vehicle display assembly 10 in vehicle door sill 24, a person entering or leaving a vehicle may be afforded an enhanced viewing experience as compared to that provided by conventional door sill plates, which are often overlooked.

In some embodiments, vehicle display assembly 10 may be positioned elsewhere within a vehicle door frame 28; for example, in an A-pillar 46, a B-pillar 48, or the upper frame proximate to a headliner of vehicle 20. Vehicle display assembly 10 may be flush with door frame 28, recessed relative to door frame 28, or protrude slightly from door frame 28. In some embodiments, vehicle display assembly 10 may be disposed on or set into a door panel 26 on the inside of vehicle door 22 as shown in FIGS. 3 and 4. Display element 30 may protrude slightly from door panel 32, be flush with door panel 32, or be recessed into door panel 32. In some embodiments, display element 30 may be canted forward, rearward, upward, or downward. In some embodiments, the cant may be generally directed upward so that display may be more readily visible by a user. It will be understood that display element 30 may be positioned anywhere on inside door panel 26 of vehicle door 22, including proximate a lower door pocket 110, adjacent to a door handle 112, or even proximate a windowsill 114 proximate a window frame 116. In some embodiments, an optional touchscreen, control panel, or other user interface device 50 may be disposed on display element 30 to enable a user to change the image shown on display element 30, to activate display element 30, or to deactivate display element 30. In some embodiments, touchscreen 50 may include functionality associated with increasing or decreasing the light output of display element 30, thereby overriding the default operating functionality of display element 30.

Referring now to FIGS. 5-12, in some embodiments, vehicle display assembly 10 may comprise at least a first housing 36, a generally transparent element 33 and display element 30. Transparent element 33 may be coupled to and at least partially housed in first housing 36. A first printed circuit board (PCB) 54 may be disposed between display element 30 and first housing 36 and may be in electrical communication with display element 30. First PCB 54 may comprise at least one light source 56 such as an LED. First PCB 54 may be double-sided, and may include circuitry for driving light source 62 and display element 30. First PCB 54 may be generally located in one of first housing 36, second housing 38, and separate housing 72.

As shown in FIGS. 9-12, in some embodiments, an optional film stack 58 for enhancing the brightness of display element 30 may be disposed between first PCB 54 and display element 30, and may be in optical communication with display element 30. Film stack 58 may be configured to enhance the brightness of display element 30 in one or more dimensions and may include at least one of a dual brightness enhancement film (DBEF), a horizontal brightness enhancement film (HBEF), and a vertical brightness enhancement film (VBEF). Additionally, in some embodiments, film stack 58 may include a diffuser configured to distribute light emitted through film stack 58. The diffuser may be positioned below or above a selected one or more brightness enhancement films and may generally distribute light evenly by softening high points of light transmissivity with respect to film stack 58 and display element 30. Accordingly, in LCD embodiments, light that is transmitted through display element 30 has a polarization that may be aligned with the polarized transmission axis of the LCD.

In some embodiments, an optional light-producing assembly 59 may be positioned behind film stack 58 and in optical communication therewith. Light-producing assembly 59 may include an optical element 60 and a light source 62. In some embodiments, optical element 60 may receive light from light source 62, and may be configured to direct light toward film stack 58 or display element 30. Optical element 60 may have a tapered backside 42 to better direct light toward film stack 58. Optical element 60 may optionally be positioned behind display element 30. Light source 62 may be disposed proximate an edge of optical element 60 and may be configured to emit light therethrough. Light source 62 may be configured, for example, as a plurality of light-emitting diodes (LEDs) spanning a length of an edge of optical element 60.

To further enhance light output toward film stack 58, an optional reflector 66 may be disposed behind and secured to optical element 60, and may be in optical communication therewith. Reflector 66 may be configured to direct light to optical element 60. In some embodiments, reflector 66 may be directly secured to a platform 67 disposed inside first housing 36 and may be configured to redirect wayward light emitted by light source 62 back into optical element 60 and toward film stack 58. Platform 67 may provide support to light-producing assembly 59 as well as to components located thereabove. Due to the relatively low clearance of a vehicle door sill 24, in some embodiments, optical element 60 may generally abut against film stack 58 to facilitate light transmission thereto and to save space. Similarly, by disposing light source 62 to provide edge-lighting to optical element 60, additional space savings can be achieved. However, it will be understood that light source 62 may alternatively provide back-lighting to optical element 60 if so desired. In some embodiments, vehicle display assembly further comprises a second housing 38. Display element 30, transparent element 33, first PCB 54, optional film stack 58, optical element 60, and optional reflector 66 may be housed in at least one of first housing 36 and second housing 38.

First and second housings 36, 38 may be constructed from aluminum or other rigid or semi-rigid material, thereby providing protection to transparent element 33. First and second housings 36, 38 may be assembled together, or may be otherwise detached. In some embodiments, first and second housings 36, 38 may form a unitary structure. In some embodiments, underside portions of first and/or second housings 36, 38 of vehicle display assembly may include an adhesive 68 (FIGS. 3 and 4) for securing vehicle display assembly 10 to a corresponding space in vehicle door sill 24.

Figure 11A:
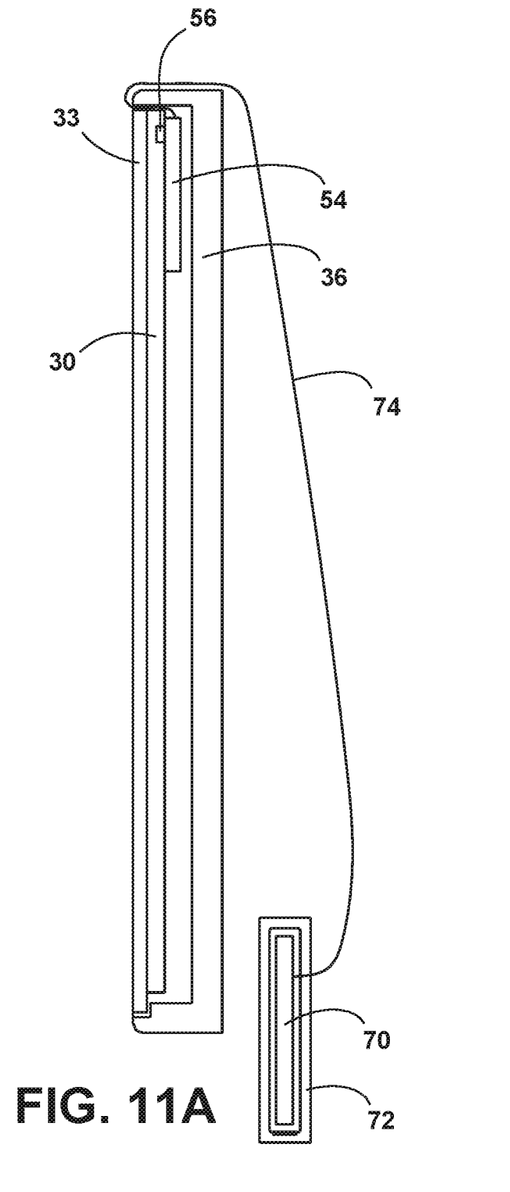
FIG. 11A is a side view of another embodiment of the vehicle display assembly.
Figure 11B:
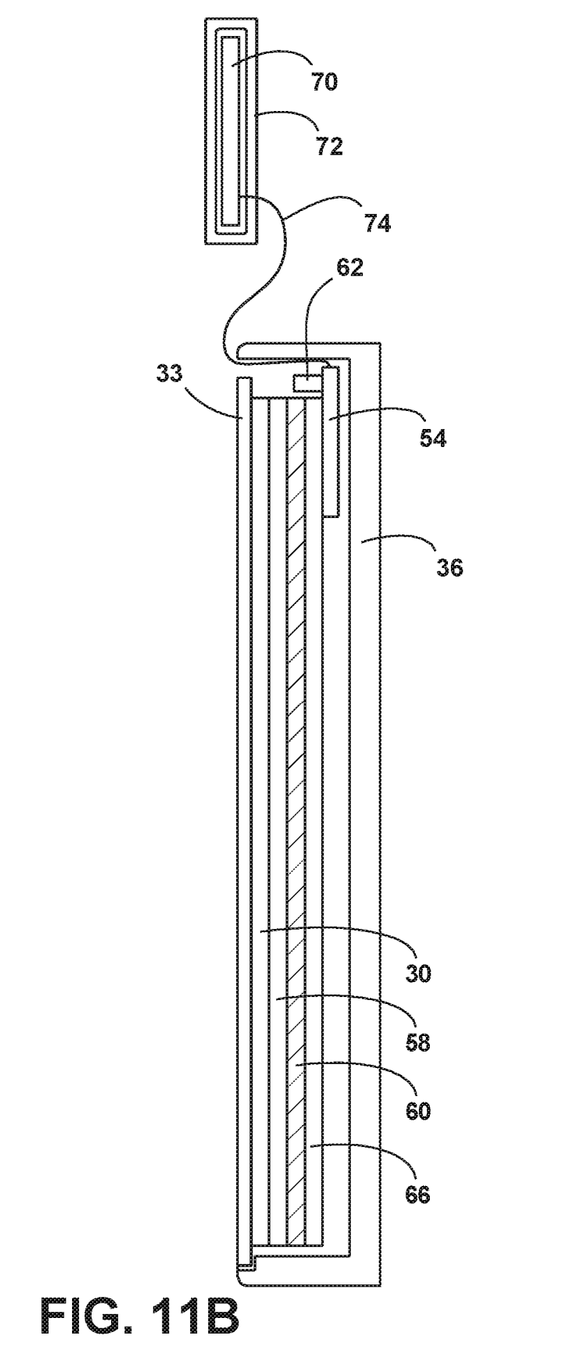
FIG. 11B is a side view of another embodiment of the vehicle display assembly.
Figure 12:
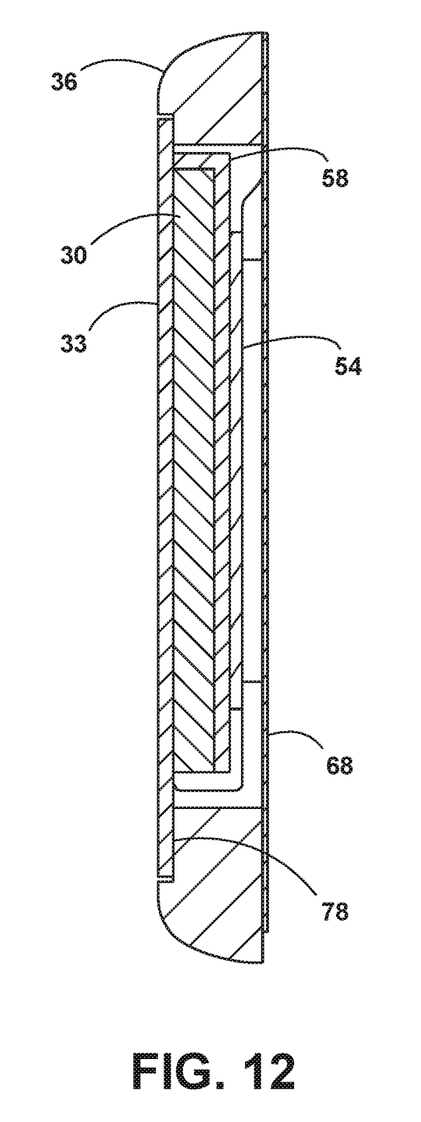
FIG. 12 is a side view of yet another embodiment of the vehicle display assembly.

In some embodiments, as best seen in FIGS. 11A and 11B, a second PCB 70 may be disposed in a location remote from the vehicle door sill 24 such as under a vehicle seat, and may be in electrical communication with first PCB 54. In some embodiments, vehicle display assembly 10 may further comprise a separate housing 72, and second PCB 70 may be housed in separate housing 72. In some embodiments, second PCB 70 may be connected to first PCB 54 through a flex cable 74. In some embodiments, second PCB 70 may comprise a controller. Controller may selectively activate and control display element 30.

Display element 30 may be disposed behind transparent element 33 and transparent element 33 may be substantially planar. In some embodiments, an optically clear adhesive 78 may be disposed on a backside 76 of transparent element 33 to adhere transparent element 33 to display element 30. In some embodiments, adhesive 78 may be applied directly to display element 30. In some embodiments, transparent element 33 may be a glass element. Transparent element 33 may serve to cover and protect display element 30. Due to being exposed to possibly harsh conditions, including exposure to the elements and potentially being stepped on by passengers entering or exiting vehicle 20, transparent element 33 may be scratch- and impact-resistant, water-resistant, and may be strengthened and hard-coated for protection. In some embodiments, a protective substrate that is scratch and water resistant (not shown) may be positioned on transparent element 33 of vehicle display assembly 10 to protect vehicle display assembly 10 from the elements.

Perimeter portions of transparent element 33 may be engaged to corresponding ribs 80 or other retaining structures of first housing 36. In some embodiments, transparent element 33 may have a height H' of about 1 millimeter.

Image data 34 may include varying intensities of light output. For example, display element 30 may include a maximum light output during daylight hours and a minimum light output during evening and night hours. It is generally contemplated that the maximum light output could be as high as 1000 candela per square meter (cd/m$^2$), although higher light output is also contemplated, depending on the application. In addition, it is generally contemplated that the light output may be directly associated with a time of day as tracked by vehicle 20, or may be associated with a photoelectric sensor 28 disposed inside or outside vehicle 20. Photoelectric sensor 82 is shown on an outside rearview mirror of vehicle 20 in FIGS. 1 and 3, although it may be disposed elsewhere on vehicle 20. The location of photoelectric sensor 82 may be a location generally exposed to ambient light. When a threshold brightness has been detected by photoelectric sensor 82, display element 30 will display images at the maximum light output. When the threshold is not met, a lesser light output, and even perhaps a minimum light output, will be utilized by display element 30.

In some embodiments, both light source 62 and display element 30 may be in electrical communication with first PCB 54 via corresponding flex cables 86, 88. Flex cables 86, 88 may be passed through a gap 90 formed between platform 67 and a sidewall of first housing 36. An electrical display connector 94 may be provided beneath first PCB 54 and may electrically connect to flex cable 88 associated with display element 30. Flex cable 86 associated with light source 62 may connect to a connector 92 provided atop first PCB 54. An external connector 96 may extend through a backside of second housing 38 to provide an electrical connection between first PCB 54 and a vehicle network (e.g., CAN, LIN, etc.), vehicle power supply, or both.

Referring to FIGS. 11A and 11B, an embodiment of vehicle display assembly 10 having first housing 36 and separate housing 72 is shown. First housing 36 may house transparent element 33, display element 30, film stack 58, and light-producing assembly 59. First PCB 54 may be housed in separate housing 72. Electrical connectors 92, 96 corresponding to light source 62 and display element 30 may be fed through a backside of first housing 36 to enable electrical connections with first PCB 54. First PCB 54 may be secured to or disposed within other vehicle structures or may be located elsewhere within vehicle 20. By excluding first PCB 54 from first housing 36 and disposing first PCB 54 in a remote location, first housing 36 benefits from a low profile and may be more easily accommodated in vehicle door sill 24. For example, it is contemplated that first housing 36 may have a height H of 6 millimeters or less.

As shown in FIGS. 6a and 6b, the orientation of the image shown on display element 30 may change to make it easier for a person entering or exiting vehicle 20 to read the message or view the image. In some embodiments, the orientation of the image displayed may depend on whether the person is outside or inside vehicle 20. For example, in FIG. 6a, image 34 is oriented for a person positioned outside vehicle 20, and the text would appear right-side up to that person. In FIG. 6b, is oriented to be right-side up for a person positioned within vehicle 20.

A vehicle 20 may have a plurality of doors 22, and each door 22 may be associated with a vehicle display assembly 10. At least one of display element 30 and the light source 62 associated with each display element 30 may be activated by, for example, the unlocking of vehicle 20, the opening of vehicle door 22 associated with vehicle display assembly 10, or the opening of any door 22 of vehicle 20. Similarly, display element 30 may be deactivated by the closing of vehicle door 22 associated with vehicle display assembly 10.

In some embodiments, vehicle display assembly 10 may be in electrical communication with at least one vehicle sensor or computer. The at least one sensor or computer may be configured to be capable of determining whether a driver or passenger is inside or outside vehicle 20; for example, the at least one sensor or computer may comprise a seat sensor configured to detect the presence of a passenger in a seat. If the sensor or computer determines a user is outside vehicle 20 by, for example, receiving input from the seat sensor that there is not a passenger in a particular seat, and receives input from a vehicle computer or other sensor that a vehicle door 22 associated with the seat has been unlocked, is opening or has opened, image 34 may be oriented so that image 34 appears right-side up to a user positioned outside vehicle 20. Conversely, if vehicle 20 determines a user is inside vehicle 20 by, for example, receiving input from a seat sensor that there is a passenger in a seat, and receives input that a vehicle door 22 associated with the seat is opening, image 34 may be oriented so image appears right-side up to a user seated within vehicle 20. In some embodiments, sensors may detect when a door handle is utilized and may orient the orientation of the image depending on whether an inside door handle or an outside door handle has been used. The user may then see image 34 in an appropriate orientation. In some embodiments, vehicle display assembly 10 may default to, for example, orienting image 34 for a user positioned outside vehicle 20 unless it receives an output from a sensor or computer indicating that a passenger is positioned inside vehicle 20 or in the seat associated with vehicle display device 10, in which case it would orient image 34 appropriately for a user inside vehicle 20. Image 34 may also be oriented so image appears right-side up to a user positioned forward or rearward of vehicle display assembly 10. The orientation of images for users in these positions may result from outputs from at least one sensor on the exterior of vehicle 20.

With reference again to FIGS. 1-4, in some embodiments, activation of display element 30 may be triggered by switch 32 disposed on a panel or a portion of vehicle door 22. In some embodiments, switch 32 may be a magnetic switch. An electrical connector 96 may be configured to supply power and data from vehicle 20 to display element 30. Upon disconnection of switch 32 with a complementary switch on B pillar 48 or door frame 28 of vehicle 20, a processor of vehicle display assembly 10 may activate display element 30. In some embodiments, photoelectric sensor 82 may be used to activate or deactivate vehicle display assembly 10. In some embodiments, vehicle display assembly 10 may be in communication with at least one vehicle system. Vehicle 20 may receive inputs from the at least one vehicle system, and those inputs may include activation cues to initiate activation or deactivation of display element 30. The activation cues may include ignition startup or shutoff of vehicle 20, remote start, remote unlock, and the like.

In some embodiments, image 34 may include a logo, emblem, badge, or any other desired graphic. In some embodiments, the displaying of image may be dependent on an event or condition. For example, image 34 may display warnings or reminders such as low fuel, low tire pressure, or keys left in vehicle 20. In some embodiments, image 34 may blink or flash on and off to attract a user's attention. In some embodiments, vehicle display assembly 10 may comprise a speaker or be in communication with a vehicle speaker, and may allow the generation of an audible signal to alert the user to the presence of a message. In some embodiments, vehicle display assembly 10 may be in communication with a cell phone or other mobile communication device and may display current or upcoming weather reports or current traffic conditions.

In some embodiments, image 34 may display personal reminders such as "Happy Birthday" or "Congratulations," or personal greetings, such as "Welcome, [User's name]." In some embodiments, display element 30 may include predefined images stored within the processor of vehicle display assembly 10, and may also include functionality allowing for images to be uploaded to vehicle display assembly 10 based on user preference. Display element 30 may include high-definition image capabilities and include processor speed sufficient to show videos as well as static images.

In some embodiments, vehicle display assembly 10 may be used to display advertising or information. For example, in a dealership, vehicle display assembly 10 may display information about vehicle 20 itself or information about the dealership. The information may be programmed into a circuit board, or vehicle display assembly 10 may be in communication with an exterior device that would transmit advertising to vehicle display assembly 10 for display. In some embodiments, vehicle display assembly 10 may be in communication with a Global Positioning System or other positioning system, and may have access to information related to the location of vehicle 20. Vehicle display assembly 10 may be linked to and in communication with, for example, the positioning system, and may display advertisements or information linked to the location of vehicle 20.

In some embodiments, vehicle 20 may be used as a livery or car-sharing vehicle, and vehicle display assembly may be in communication with an app or a mobile network that comprises information on the scheduled ride, for example, the rider's name and the agreed-on fare. Vehicle display assembly 10 may show, for example, a personalized greeting when a rider enters vehicle 20, thereby confirming that they have entered the correct vehicle. Vehicle display assembly 10 further may indicate the fare paid upon the termination of the ride. In some embodiments, vehicle display assembly 10 may be used in commercial delivery vehicles. In some commercial delivery vehicles, doors may be left open between deliveries. In some embodiments, vehicle display assembly 10 may display, for example turn-by-turn directions to the driver of the commercial vehicle 20, directing the driver from one stop to the next, or identify what is to be delivered or picked up at various stops.

In some embodiments, a display assembly for a vehicle comprises a display element configured to provide image data to a vehicle occupant, the display assembly further comprising a magnetic switch operable to activate the display element when the vehicle door is opened; and an electrical connector configured to supply power and data to the display element. In some embodiments, the display assembly further comprises a cover assembly extending over the display element. In some embodiments, the display assembly further comprises a photoelectric sensor configured to at least one of activate and adjust the brightness of the display element. In some embodiments, the display assembly is in communication with at least one vehicle system, and the display assembly activates upon the unlocking or startup of the vehicle. In some embodiments, the display assembly is disposed in a door panel of a vehicle door. In some embodiments, the display element is disposed in a door panel of a vehicle and is canted upward. In some embodiments, the display element is disposed in the door sill of a vehicle. In some embodiments, the display element further comprises a user interface in proximity to the display element. In some embodiments, the user interface is configured to allow a user to at least one of activate the display element, adjust images displayed on the display element, and adjust brightness of the display element. In some embodiments, the display assembly further comprises a processor, and images to be displayed on the display element are stored in the processor. In some embodiments, the display assembly further comprises a cover assembly extending over the display element. In some embodiments, the display element is disposed within a housing.

In some embodiments, the display assembly comprises a display element configured to provide image data to a vehicle occupant, the display assembly comprising a magnetic switch configured to supply power to the display element when the vehicle door is opened; an electrical connector configured to supply power and data to the display element; and a memory module configured to supply stored image data to the display element. In some embodiments, the display assembly further comprises a cover assembly extending over the display element. In some embodiments, the cover assembly includes a clear cover member extending over the display element. In some embodiments, the display assembly comprises a display element configured to provide image data to a vehicle occupant, the display element comprising a magnetic switch configured to provide power to the display element based on an activation cue; and an electrical connector configured to supply power and data to the display element. In some embodiments, the display assembly further comprises a cover assembly extending over the display element. In some embodiments, the cover assembly includes a clear cover member extending over the display element.

In some embodiments, a vehicle display assembly comprises a transparent element defining a viewing surface; a display element disposed behind the transparent element; a film stack optically coupled to the display element and configured to enhance the brightness of the display element in one or more dimensions; a light-producing assembly positioned behind the brightness enhancing film stack and optically coupled thereto, the light-producing assembly having an optical element and a light source disposed proximate an edge of the optical element and configured to emit light therethrough; and a printed circuit board electrically coupled to the light source and the display element; wherein the display element is configured to generate an image visible through the transparent element. In some embodiments, the display element comprises a liquid crystal display. In some embodiments, the film stack comprises at least one of a dual brightness enhancement film, a horizontal brightness enhancement film, and a vertical brightness enhancement film. In some embodiments, the film stack comprises a diffuser configured to distribute light emitted through the film stack. In some embodiments, the light-producing assembly comprises a reflector configured to redirect wayward light emitted by the light source back into the optical element and toward the film stack. In some embodiments, the vehicle display assembly further comprises a housing configured to house only the transparent element, the display element, the film stack, and the light-producing assembly. In some embodiments, the printed circuit board is housed separately from the housing.

In some embodiments, a vehicle display assembly comprises a display element disposed within a vehicle; and a first printed circuit board in electrical communication with the display element; wherein the vehicle display assembly is associated with and in proximity to one of a door and a door frame of a vehicle. In some embodiments, the vehicle display assembly further comprises a processor and a transparent element defining a viewing surface; wherein the display element is configured to generate an image visible through the transparent element; and wherein the image displayed is stored in the processor. In some embodiments, the image may be stored in additional memory. The additional memory may include RAM or flash memory. In some embodiments, the vehicle display assembly is in electrical communication with at least one of a vehicle sensor and a vehicle computer; and the at least one of vehicle sensor and vehicle computer is configured to provide an output to the vehicle display assembly. In some embodiments, the vehicle display assembly is associated with a door of the vehicle; and the vehicle display assembly is configured to display an image upon receiving an output that the door associated with the vehicle display assembly is opening. In some embodiments, the vehicle display assembly further comprises a processor; the image displayed is stored in the processor. In some embodiments, the vehicle display assembly is configured to display an image oriented toward a user inside a vehicle when the output indicates the presence of a user inside the vehicle. In some embodiments, the vehicle display assembly is configured to display an image oriented toward a user outside a vehicle when the output indicates the absence of a user inside the vehicle. In some embodiments the display element comprises a liquid crystal display. In some embodiments, the vehicle display assembly further comprises a switch disposed on one of a vehicle door and the vehicle door frame; wherein the switch is configured to activate the vehicle display assembly when the vehicle door is opened. In some embodiments, the vehicle display assembly further comprises a housing; the housing houses at least the transparent element and the display element. In some embodiments, the vehicle display assembly of claim 1, further comprises a film stack in optical communication with the display element, the film stack configured to enhance the brightness of the display element in one or more dimensions; wherein the film stack comprises at least one of a dual brightness enhancement film, a horizontal brightness enhancement film, and a vertical brightness enhancement film. In some embodiments, the film stack further comprises a diffuser configured to distribute light emitted through the film stack. In some embodiments, the vehicle display assembly further comprises a light producing assembly positioned behind and in optical communication with the film stack, the light producing assembly having an optical element and a light source disposed proximate an edge of the optical element and configured to emit light therethrough; wherein the light-producing assembly comprises a reflector configured to redirect wayward light emitted by the light source back into the optical element and toward the film stack. In some embodiments, the first printed circuit board is housed separately from the housing. In some embodiments, the vehicle display assembly further comprises a separate housing, and the first printed circuit board is housed in the separate housing. In some embodiments, the vehicle display assembly further comprises a second printed circuit board in electrical communication with the first printed circuit board. In some embodiments, the vehicle display assembly is in electrical communication with at least one of a vehicle sensor and a vehicle computer; and the at least one of a vehicle sensor and a vehicle computer is configured to provide an output to the vehicle display assembly. In some embodiments, a vehicle seat is associated with the door of the vehicle; and the vehicle display assembly displays an image oriented toward a user inside a vehicle when the output indicates the presence of an occupant in the vehicle seat. In some embodiments, a vehicle seat is associated with the door of the vehicle; and the vehicle display assembly displays an image oriented toward a user outside the vehicle when the output indicates an absence of an occupant in a vehicle seat.

In some embodiments, a vehicle display assembly comprises a transparent element defining a viewing surface; a display element disposed behind the transparent element; a first printed circuit board disposed behind the display element; and a housing at least partially enclosing the transparent element, the display element, and the first printed circuit board; wherein the display element is configured to generate an image visible through the transparent element; and wherein the vehicle display assembly is associated with and in proximity to a door of a vehicle. In some embodiments, the first printed circuit board comprises a light source; and wherein the light source is in optical communication with the display element and the transparent element. In some embodiments, the vehicle display assembly further comprises a second printed circuit board having a controller in electrical communication with the first printed circuit board and in communication with at least one of a vehicle sensor and a vehicle computer; the second printed circuit board is disposed in a location remote from the housing and first printed circuit board; the second printed circuit board is connected to the first printed circuit board; and the controller is configured to at least selectively activate the display element. In some embodiments, a vehicle seat is associated with the door of the vehicle; the vehicle display assembly displays an image oriented toward a user inside the vehicle when the output indicates the presence of an occupant in a vehicle seat; and the vehicle display assembly displays an image oriented toward a user outside the vehicle when the output indicates the absence of an occupant in the vehicle seat.

It will be understood by one having ordinary skill in the art that construction of the vehicle display assembly and associated components is not limited to any specific material. Other representative embodiments of the disclosure may be formed from a wide variety of materials, unless described otherwise herein.

For purposes of description herein, the terms "upper," "lower," "right," "left," "rear," "front," "vertical," "horizontal," and derivatives thereof shall relate to the disclosure as oriented in FIG. 5. However, it is to be understood that the vehicle display assembly may assume various alternative orientations, except where expressly specified to the contrary. It is also to be understood that the specific devices and processes illustrated in the attached drawings, and described in the following specification, are simply representative embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The construction and arrangement of the elements of the vehicle display assembly as shown in the representative embodiments above is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the representative embodiments without departing from the spirit of the present innovations.

It will be understood that any described processes or steps within described processes may be combined with other disclosed processes or steps to form structures within the scope of the present disclosure. The structures and processes disclosed herein are for illustrative purposes and are not to be construed as limiting.

The above description is considered that of the representative embodiments only. Modifications of the vehicle display assembly will occur to those skilled in the art and to those who make or use the vehicle display assembly. Therefore, it is understood that the embodiments shown in the drawings and described above are merely for illustrative purposes and not intended to limit the scope of the disclosure, which is defined by the claims as interpreted according to the principles of patent law, including the doctrine of equivalents.

What is claimed is:

1. A vehicle display assembly comprising:
    a display element disposed within a vehicle and in electrical communication with at least one of a vehicle sensor and a vehicle computer, the at least one of vehicle sensor and vehicle computer configured to provide an output to the vehicle display assembly;
    a first printed circuit board in electrical communication with the display element;
    a transparent element defining a viewing surface; and
    a light source in optical communication with the display element;
    wherein the display element is configured to generate an image visible through the transparent element; and
    wherein the vehicle display element is disposed in a doorsill of the vehicle;
    wherein a vehicle seat is associated with the doorsill of the vehicle;
    wherein the at least one of vehicle sensor and vehicle computer is capable of indicating the presence or absence of a user in the associated vehicle seat;
    wherein, when the output indicates the presence of a user in the associated vehicle seat, the vehicle display assembly is configured to display an image oriented toward the user in the vehicle seat; and
    wherein, when the output indicates the absence of a user in the associated vehicle seat, the vehicle display assembly is configured to display an image in the display element in the doorsill when the vehicle door is in an open position, the image oriented toward a user positioned outside the vehicle in proximity to the vehicle door sill.

2. The vehicle display assembly of claim 1, further comprising a processor wherein the image displayed on the display element is stored in the processor.

3. The vehicle display assembly of claim 2, further comprising a housing configured to house at least the transparent element and the display element.

4. The vehicle display assembly of claim 1, wherein the vehicle display assembly is associated with a door of the vehicle; and wherein the vehicle display assembly displays an image upon receiving output that the door associated with the vehicle display assembly is one of opening and in an open position.

5. The vehicle display assembly of claim 1, wherein the display element comprises a liquid crystal display.

6. The vehicle display assembly of claim 1, further comprising a switch disposed on one of the vehicle door and the vehicle door frame; wherein the switch is configured to activate the vehicle display assembly when the vehicle door is opened.

7. The vehicle display assembly of claim 1, further comprising a film stack in optical communication with the display element, the film stack configured to enhance the brightness of the display element in one or more dimensions; wherein the film stack comprises at least one of a dual brightness enhancement film, a horizontal brightness enhancement film, and a vertical brightness enhancement film.

8. The vehicle display assembly of claim 7, wherein the film stack further comprises a diffuser configured to distribute light emitted through the film stack.

9. The vehicle display assembly of claim 7, further comprising a light producing assembly positioned behind and in optical communication with the film stack, the light producing assembly having an optical element and a light source disposed proximate an edge of the optical element and configured to emit light therethrough; wherein the light-producing assembly comprises a reflector configured to redirect wayward light emitted by the light source back into the optical element and toward the film stack.

10. The vehicle display assembly of claim 3, wherein the printed circuit board is housed separately from the housing.

11. The vehicle display assembly of claim 1, further comprising a second printed circuit board in electrical communication with the first printed circuit board.

12. The vehicle display assembly of claim 1, wherein the display element is disposed on a vehicle door sill.

* * * * *